(12) United States Patent
Ishii et al.

(10) Patent No.: US 9,713,795 B2
(45) Date of Patent: Jul. 25, 2017

(54) POROUS POLYTETRAFLUOROETHYLENE MEMBRANE AND WATERPROOF AIR-PERMEABLE MEMBER

(75) Inventors: Kyoko Ishii, Osaka (JP); Seiji Aizawa, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 14/395,991

(22) PCT Filed: Jul. 4, 2012

(86) PCT No.: PCT/JP2012/004345
§ 371 (c)(1),
(2), (4) Date: Oct. 21, 2014

(87) PCT Pub. No.: WO2013/168203
PCT Pub. Date: Nov. 14, 2013

(65) Prior Publication Data
US 2015/0050464 A1    Feb. 19, 2015

(30) Foreign Application Priority Data
May 8, 2012   (JP) ................................. 2012-107018

(51) Int. Cl.
| | | |
|---|---|---|
| *B01D 71/36* | (2006.01) | |
| *B01D 53/22* | (2006.01) | |
| *B01D 67/00* | (2006.01) | |
| *B01D 69/02* | (2006.01) | |
| *B01D 63/08* | (2006.01) | |

(52) U.S. Cl.
CPC ............ *B01D 71/36* (2013.01); *B01D 53/228* (2013.01); *B01D 63/087* (2013.01); *B01D 67/0027* (2013.01); *B01D 69/02* (2013.01); *B01D 2313/025* (2013.01); *B01D 2313/04* (2013.01); *B01D 2325/20* (2013.01); *Y10T 428/24777* (2015.01)

(58) Field of Classification Search
CPC ..................................................... B01D 71/36
See application file for complete search history.

(56) References Cited

U.S. PATENT DOCUMENTS

| | | | | |
|---|---|---|---|---|
| 5,476,589 A | * | 12/1995 | Bacino ............... | B01D 39/1692 210/500.36 |
| 8,449,660 B2 | | 5/2013 | Shimatani et al. | |

(Continued)

FOREIGN PATENT DOCUMENTS

| | | |
|---|---|---|
| JP | 2003-503991 | 1/2003 |
| JP | 2009-501632 | 1/2009 |

(Continued)

*Primary Examiner* — Ian Rummel
(74) *Attorney, Agent, or Firm* — Hamre, Schumann, Mueller & Larson, P.C.

(57) ABSTRACT

Provided is a porous polytetrafluoroethylene (PTFE) membrane that satisfies the following expressions: $0.2 \leq F \leq 4.0$; $0.2 \leq R \leq 1.0$; and $R \geq -0.1F + 0.5$, for the Frazier number F [cm$^3$/sec/cm$^2$] and the water entry pressure R [MPa]. This porous PTFE membrane may be a single-layer membrane. This porous PTFE membrane has the properties suitable for use as a waterproof air-permeable membrane, and achieves a good balance between high water resistance and high air permeability.

4 Claims, 4 Drawing Sheets

(56) References Cited

U.S. PATENT DOCUMENTS

| | | | |
|---|---|---|---|
| 8,784,983 B2 | 7/2014 | Hisano et al. | |
| 2007/0012624 A1* | 1/2007 | Bacino | B01D 39/1692 210/650 |
| 2011/0188247 A1 | 8/2011 | Huang et al. | |
| 2011/0268959 A1 | 11/2011 | Thottupurathu | |

FOREIGN PATENT DOCUMENTS

| | | |
|---|---|---|
| JP | 2009-073051 | 4/2009 |
| JP | 2009-179656 | 8/2009 |
| JP | 2010-110914 | 5/2010 |
| JP | 2011-231321 | 11/2011 |
| JP | 2012-025160 | 2/2012 |
| WO | 01/03468 | 1/2001 |
| WO | 2007/011492 | 1/2007 |

\* cited by examiner (a)

(b)

POROUS POLYTETRAFLUOROETHYLENE MEMBRANE AND WATERPROOF AIR-PERMEABLE MEMBER

TECHNICAL FIELD

The present invention relates to a porous polytetrafluoroethylene (hereinafter referred to as "PTFE") membrane and a waterproof air-permeable member including this porous PTFE membrane.

BACKGROUND ART

Porous PTFE membranes are generally produced as follows. A mixture obtained by mixing a PTFE fine powder and a liquid lubricant serving as an extrusion aid is extrusion-molded, and the resulting molded body is rolled into a sheet. The liquid lubricant is removed from the PTFE sheet thus obtained by rolling, and then the resulting PTFE sheet, from which the liquid lubricant has been removed, is stretched to make the sheet porous. The porous PTFE membrane thus obtained has a porous structure of nodes and fibrils, as is well known.

Housings of some electronic devices and lighting devices are provided with openings. In such an electronic device, acoustic energy propagates, through the opening, between an acoustic transducer such as a microphone or a speaker mounted in the housing and the outside of the housing. In the case of the housing of a lighting device, air that is expanded by heat produced from a light emitter is discharged to the outside of the housing through the opening. Since small-sized electronic devices such as mobile phones and vehicle lighting devices such as automotive headlights require high waterproofness in some cases, water intrusion through the openings needs to be prevented. Therefore, waterproof air-permeable members having both water resistance and air permeability (sound transmittance) are often disposed at the openings of the housings of these devices.

A waterproof air-permeable member used in an electronic device is also referred to as a waterproof sound-transmitting member, but hereinafter in this description, the term "waterproof air-permeable member" is used as a term representing the concept including a waterproof sound-transmitting member.

The performance of a porous PTFE membrane for use as a waterproof air-permeable member is evaluated using the water resistance and air permeability as indicators, but these two properties are in a so-called trade-off relationship. Therefore, there have been proposals to use a multilayer porous PTFE membrane so as to provide a waterproof air-permeable member having both excellent water resistance and excellent air permeability.

Patent Literature 1 proposes that a porous PTFE membrane be produced by applying a pressure to a laminated body of a first unsintered sheet made of PTFE having a standard specific gravity of 2.16 or more and a second unsintered sheet made of PTFE having a standard specific gravity of less than 2.16 to pressure-bond them, and further stretching the pressure-bonded article. Porous PTFE membranes having excellent air permeability tend to be obtained from PTFE having a high standard specific gravity, in other words, having a low molecular weight. Porous PTFE membranes having excellent water resistance tend to be obtained from PTFE having a low standard specific gravity, in other words, having a high molecular weight. In view of this tendency, in Patent Literature 1, the above-mentioned two types of PTFE sheets are used in combination to achieve a good balance between water resistance and air permeability. Patent Literature 1 reports that porous PTFE membranes each having a water entry pressure of 0.31 to 0.33 MPa and an air permeability of 3 to 5 sec/100 ml in terms of Gurley number (equivalent to about 0.31 to 0.52 $cm^3/sec/cm^2$ in terms of Frazier number) were obtained in Examples.

CITATION LIST

Patent Literature

Patent Literature 1: JP 2010-110914 A

SUMMARY OF INVENTION

Technical Problem

There is a limit in improving the porous PTFE membrane by laminating two PTFE sheets. So, it is an object of the present invention to provide a porous PTFE membrane having both excellent water resistance and excellent air permeability. It is another object of the present invention to provide a novel waterproof air-permeable member using an improved porous PTFE membrane.

Solution to Problem

The present invention provides a porous PTFE membrane that satisfies the following relational expressions (1) to (3):

$$0.2 \leq F \leq 4.0 \quad (1);$$

$$0.2 \leq R \leq 1.0 \quad (2); \text{ and}$$

$$R \geq -0.1F + 0.5 \quad (3),$$

when air permeability in terms of Frazier number is denoted by F [$cm^3/sec/cm^2$] and water entry pressure is denoted by R [MPa].

Here, the Frazier number is a value measured using a Frazier type tester specified in Japanese Industrial Standards (JIS) L 1096, and the water entry pressure is a value measured using a water resistance tester (high pressure method) specified in JIS L 1092.

It is known that when the air permeability measured by the air permeability measurement B method (Gurley test method) specified in JIS L 1096 is expressed in terms of Gurley number G [sec/100 ml], the Frazier number can be calculated by converting the Gurley number G using the following relational expression (4):

$$F = 1.57/G \quad (4).$$

Another aspect of the present invention provides a waterproof air-permeable member including: a porous PTFE membrane; and a fixing member disposed on the porous PTFE membrane. In this air-permeable member, the fixing member is joined to a joining portion of the porous PTFE membrane that surrounds an air-permeable region of the porous PTFE membrane, and the porous PTFE membrane is the porous PTFE membrane according to the present invention.

Advantageous Effects of Invention

According to the present invention, it is possible to produce a porous PTFE membrane having both excellent water resistance and excellent air permeability in spite of its single-layer structure.

DESCRIPTION OF EMBODIMENTS

Figure 1:
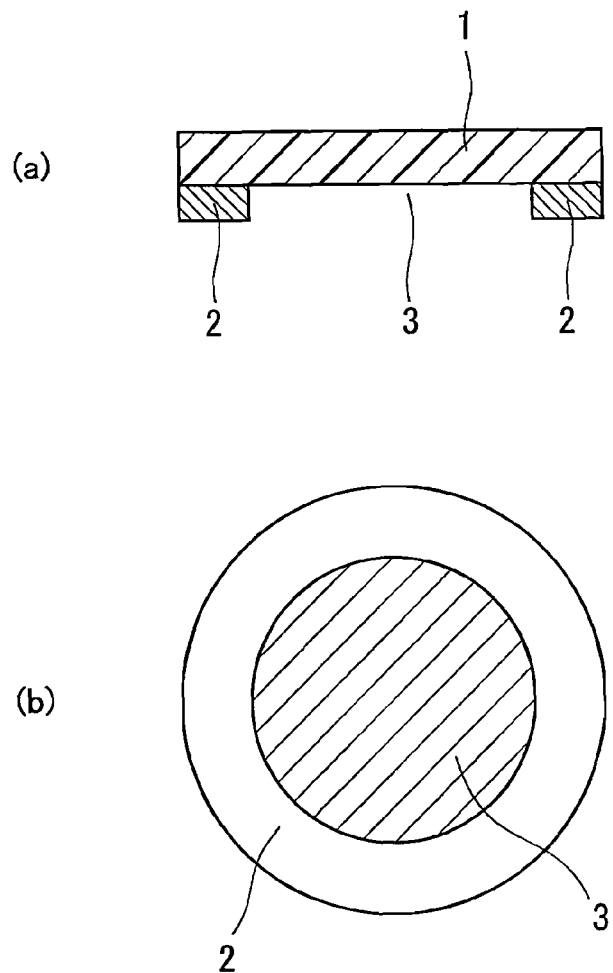
FIG. 1 shows a cross-sectional view (a) and a plan view (b) of an embodiment of a waterproof air-permeable member according to the present invention.

The porous PTFE membrane of the present invention can be obtained by the following production method. The following method is suitable for producing the porous PTFE membrane of the present invention, but the porous PTFE membrane of the present invention is not limited to those produced by the following method.

The method of the present embodiment suitable for producing the porous PTFE membrane of the present invention is a method for producing a porous PTFE membrane, including: a step A of extruding a mixture containing a PTFE fine powder having a standard specific gravity of 2.19 or less and a liquid lubricant into a sheet using a flat die so as to obtain a PTFE sheet; a step B of rolling the PTFE sheet by passing the sheet between a pair of rolls in a longitudinal direction of the sheet that is a direction of the extrusion in the step A; a step C of stretching the PTFE sheet in a transverse direction perpendicular to the longitudinal direction of the sheet; a step D of removing the liquid lubricant from the PTFE sheet that has been rolled in the step B and stretched in the step C; and a step E of stretching the PTFE sheet, from which the liquid lubricant has been removed in the step D, both in the longitudinal direction of the sheet and in the transverse direction of the sheet so as to obtain a porous PTFE membrane. This production method may further include a step F of sintering the porous PTFE membrane at a temperature equal to or higher than the melting point of PTFE.

Conventionally, a mixture containing a PTFE fine powder and a liquid lubricant is basically extruded into a round bar form. This is because since the round bar is rolled into a sheet anyway in the subsequent rolling step, there is no need to extrude the mixture into a sheet form only for the purpose of obtaining a PTFE sheet. In contrast, in the production method of the present embodiment, the mixture is extruded into a sheet form using a flat die (T-die) (Step A).

Next, the PTFE sheet extruded from the die is rolled by being passed between the pair of rolls in the longitudinal direction of the sheet (i.e., in the MD direction or the machine direction, which is the extrusion direction in the step A) (Step B). Roll rolling is conventionally performed. However, since conventional rolling is performed on a round bar-shaped PTFE molded body (PTFE bar) obtained by extrusion, the PTFE molded body is rolled out in its transverse direction perpendicular to its longitudinal direction (i.e., in the TD direction, which is the direction perpendicular to the machine direction) so as to obtain an extended thin sheet.

In contrast, in the present embodiment, a pre-extruded sheet-like PTFE molded body (PTFE sheet) is subjected to rolling. Therefore, the PTFE sheet is stretched primarily in the rotational direction of the surface of the rolls, that is, the longitudinal direction of the PTFE sheet. The direction in which the PTFE molded body is subjected to a stress and then stretched by the stress is different from that in the conventional methods, although basically the same apparatus is used.

It is preferable to perform the step B while maintaining the length of the PTFE sheet in the transverse direction. In this case, the PTFE sheet is extended only in its longitudinal direction. Specifically, this rolling can be performed by passing the PTFE sheet between a pair of pressure rolls for rolling while pulling the PTFE sheet by a pull roll disposed downstream of the pair of pressure rolls in the sheet feeding direction. During the rolling, if the rotational speed of the pull roll is set to a slightly higher speed than that of the pressure rolls, the PTFE sheet is stretched in its longitudinal direction, with the length of the sheet in the transverse direction being kept unchanged.

Subsequently, the rolled PTFE sheet is stretched in its transverse direction (Step C). Thus, in these stretching steps, the PTFE sheet containing the liquid lubricant is stretched in the longitudinal direction and then in the transverse direction sequentially.

The subsequent steps D and E are performed basically in the same manner as in the conventional methods. Specifically, first, the PTFE sheet is heated to remove the liquid lubricant (Step D). Subsequently, the PTFE sheet is stretched in its longitudinal direction and transverse direction to produce a porous PTFE membrane (Step E). Preferably, the step E is performed at a temperature lower than the melting point of PTFE. Then, the porous PTFE membrane may be heated at a temperature equal to or higher than the melting point of PTFE so as to be sintered (Step F). As conventionally done, the stretch ratios are adjusted as appropriate in the step E to obtain desired properties. The area stretch ratio, calculated as the product of the stretch ratio in the longitudinal direction and the stretch ratio in the transverse direction, is suitably 4 or more and less than 150, for example. In order to achieve a good balance between the air permeability and the water resistance, the area stretch ratio is preferably 16 or more and 140 or less, and particularly preferably 30 or more and 140 or less. In some cases, the area stretch ratio is preferably 50 or more and 140 or less. If high air permeability is not required, the area stretch ratio may be 16 or more and less than 30.

The porous PTFE membrane obtained through the above steps sometimes exhibits new distinctive features in its membrane structure that have not been observed in conventional porous PTFE membranes. Presumably, the extrusion using a flat die (Step A) and the sequential wet stretchings of the PTFE sheet in the longitudinal direction and the transverse direction (Steps B and C) contribute to the exhibition of these features. More specifically, it is presumed that the fibrillation of the PTFE fine powder is affected by the stress applied thereto in the flat die and the stresses applied thereto by the sequential wet stretchings, which causes a change in the membrane structure.

Compared to the membrane structure of porous PTFE membranes obtained by conventional typical production methods in which a round bar-shaped PTFE molded body obtained by extrusion is rolled into a sheet and the sheet is subjected to stretching to make it porous without being subjected to wet stretching in the transverse direction, the membrane structure of the present invention has the following distinctive features.

First, the diameter of fibrils is reduced. Second, the size of "nodes" is significantly reduced and is too small to identify as nodes in a conventional membrane structure, and the number of "nodes" per unit membrane volume is increased accordingly. Third, the percentage of fibrils extending in directions other than the stretching directions is increased, in other words, the fibrils are oriented more randomly and extend more isotropically. In view of these features, it is a reasonable guess that the PTFE fine powder becomes more susceptible to fibrillation. In addition, this membrane structure, in which thin fibrils extend not in a specific direction but in more random directions and nodes are split into smaller ones, is basically suitable for improving both the water resistance and air permeability of the porous PTFE membrane. In particular, when the area stretch ratio of a porous PTFE membrane having this membrane structure is increased to improve its air permeability, the fibrillation is significantly promoted and thus not only the air permeability but also the water resistance is improved in some cases.

It is preferable to use a PTFE fine powder having a standard specific gravity of 2.19 or less, particularly 2.16 or less, as a raw material. The standard specific gravity, which is also referred to as "SSG", is the specific gravity determined by the measurement method according to JIS K 6892. It is known that the standard specific gravity tends to be negatively correlated with the average molecular weight (the smaller the standard specific gravity, the higher the average molecular weight). For example, the standard specific gravity and the average molecular weight of Fluon CD-123 (manufactured by Asahi Fluoropolymers, Co., Ltd.) are 2.155 and 12,000,000, respectively. The standard specific gravity and the average molecular weight of Fluon CD-145 (manufactured by Asahi Fluoropolymers, Co., Ltd.) are 2.165 and 8,000,000, respectively. The standard specific gravity and the average molecular weight of Fluon CD-1 (manufactured by Asahi Fluoropolymers, Co., Ltd.) are 2.20 and 2,000,000, respectively.

According to the present invention, it is also possible to obtain a porous PTFE membrane that satisfies the following relational expression (3a) as well as the relational expressions (1) and (2).

$$R \geq -0.1F + 0.6 \quad (3a)$$

According to the present invention, it is also possible to obtain a porous PTFE membrane that satisfies the following relational expression (1a) as well as the relational expressions (2) and (3). This porous PTFE membrane is suitable for use in a housing (for example, an automotive headlamp) that requires relatively high air permeability. According to the present invention, it is also possible to obtain a porous PTFE membrane that satisfies the relational expression (2a) as well as the relational expression (1a). When these relational expressions are satisfied, the relational expression (A-3) and the relational expression (A-3a) automatically hold.

$$1.0 \leq F \leq 4.0 \quad (1a)$$

$$0.5 \leq R \leq 1.0 \quad (2a)$$

Waterproof air-permeable members require a limited range of air permeability and a very high water entry pressure in some applications. For example, in the case where a thin porous PTFE membrane is used in order to propagate acoustic energy mainly by vibrations of the porous PTFE membrane itself, the most important property to be focused on is the water entry pressure. According to the present invention, it is also possible to provide a porous PTFE membrane suitable for this application. This porous PTFE membrane satisfies, for example, the following relational expressions (1b) and (2b). When these relational expressions are satisfied, the relational expression (3) automatically holds.

$$0.2 \leq F < 1.0 \quad (1b)$$

$$0.5 \leq R \leq 1.0 \quad (2b)$$

According to the present invention, it is also possible to provide a porous PTFE membrane having a water entry pressure R of 0.6 or more. The upper limit of the value of R is not particularly limited, but it may be 0.9 or less, and even 0.8 or less.

According to the present invention, it is possible to improve both the water resistance and air permeability of a porous PTFE membrane even if the membrane is not a multilayer membrane having two or more porous PTFE layers but a single-layer membrane. Generally, single-layer membranes are advantageous over multilayer membranes in terms of production cost. The number of layers of a porous PTFE membrane can be determined by, for example, cross-sectional observation using a scanning electron microscope.

Hereinafter, each step of the production method of the present invention is described in more detail. In the step A, the mixing ratio of the PTFE fine powder and the liquid lubricant is suitably adjusted so that the mixture contains, for example, 5 to 50 parts by mass of the liquid lubricant, particularly 5 to 30 parts by mass of the liquid lubricant, per 100 parts by mass of the PTFE fine powder. As the liquid lubricant, a conventionally used hydrocarbon oil such as liquid paraffin or naphtha can be used.

In the step A, a flat die is used for extrusion of the mixture containing the PTFE fine powder. Examples of the flat die (T-die) include a straight manifold type T-die, a coat hanger type T-die, and a fishtail type T-die. Since the extrusion molding in the step A is not extrusion molding of a molten material but extrusion molding of a pasty material containing an extrusion aid, the viscosity of the mixture to be extruded is high. Therefore, it is most suitable to use a fishtail type T-die (fishtail die) among the above-mentioned dies.

The appropriate thickness of the PTFE sheet obtained by the extrusion in the step A is 0.5 to 5.0 mm, particularly 1.2 to 2.0 mm.

In the step B, the PTFE sheet containing the liquid lubricant is rolled out into a thinner sheet than the sheet obtained by the extrusion. Thus, a sheet having a uniform thickness is obtained. This rolling can be performed, for example, as a process in which the length of the PTFE sheet in the transverse direction is not changed. In this case, the rolling in the step B is a process for extending the PTFE sheet only in its longitudinal direction.

Specifically, it is preferable that the rolling in the step B be performed by passing the PTFE sheet between a pair of pressure rolls for rolling while pulling the PTFE sheet by a pull roll disposed downstream of the pair of pressure rolls in the sheet feeding direction. During the rolling, if the rotational speed of the pull roll is set to a slightly higher speed than that of the pressure rolls, the PTFE sheet is stretched in its longitudinal direction, with the length of the sheet in the transverse direction being kept unchanged.

Preferably, the rolling of the PTFE sheet in the step B is performed so that the length of the sheet in the transverse direction after the rolling is in a range of 90% to 110%, and preferably in a range of 95% to 105%, of the length of the sheet in the transverse direction before the rolling. In this description, if a change in the length of the sheet in the transverse direction is in the above range, it is deemed that the sheet has been rolled "with the length of the sheet in the transverse direction being kept unchanged".

In the step B, it is preferable to roll the PTFE sheet into a sheet having a thickness of 50 to 2000 μm, particularly 100 to 900 μm. In the step B, it is preferable to roll the PTFE sheet into a sheet having a reduced thickness to 70% or less, for example 5 to 60%, of the thickness of the sheet before the rolling.

In the step C, the PTFE sheet containing the liquid lubricant is stretched in its transverse direction. This stretching may be performed using a tenter, which has been frequently used for stretching in the transverse direction. The appropriate stretch ratio in the step C is 1.2 to 10, particularly 2.0 to 8.0, and more particularly 5.0 to 8.0. If the stretch ratio is too low, it is difficult to change the membrane structure sufficiently. On the other hand, if the stretch ratio is too high, the strength in the longitudinal direction may decrease or the membrane thickness may become uneven.

In the step D, the liquid lubricant is removed from the PTFE sheet that has been stretched in the transverse direction. This step may be performed by drying the PTFE sheet, specifically by maintaining the PTFE sheet containing the liquid lubricant at a temperature suitable for removing the liquid lubricant, as is conventionally done. The temperature suitable for drying is about 100° C. to 300° C.

The rolling in the step B and the stretching in the step C need to be performed on the PTFE sheet containing the liquid lubricant. Therefore, it is preferable to perform these steps while maintaining the temperature of the PTFE sheet at 100° C. or lower, and preferably at 60° C. or lower.

In the step E, the PTFE sheet from which the liquid lubricant has been removed is stretched in its longitudinal direction and transverse direction sequentially. Thus, the sheet is made porous. The stretching in the longitudinal direction may be performed by the roll stretching method utilizing a difference in the rotational speed of rolls, and the stretching in the transverse direction may be performed by the tenter stretching method using a tenter, respectively, as is conventionally done. Any of the stretching in the longitudinal direction and the stretching in the transverse direction may be performed earlier than the other.

The stretch ratio in the step E has a significant influence on the membrane structure and the membrane properties of the resulting porous PTFE membrane. The stretch ratio in the step E may be set as appropriate according to the desired membrane properties. It is difficult to definitely determine a preferred range of stretch ratios because the appropriate stretch ratio varies depending on the conditions of rolling, stretching, etc. in each step from the step A up to the step E. It is normal that the stretch ratio in the longitudinal direction is suitably 2 to 50, particularly suitably 4 to 20, and the stretch ratio in the transverse direction is suitably 3 to 70, particularly suitably 4 to 30. A preferred range of the stretching factor obtained by multiplying the stretch ratio in the longitudinal direction (longitudinal stretch ratio) by the stretch ratio in the transverse direction (transverse stretch ratio), that is, the area stretch ratio, is as described above.

Preferably, the stretching in the step E is performed at a temperature lower than the melting point of PTFE (327° C.), for example, at 60° C. to 300° C., particularly at 110° C. to 150° C. Generation of thinner fibrils is promoted by the stretchings in the step E.

In the step F, the porous PTFE membrane is heated to a temperature equal to or higher than the melting point of PTFE. This heating step is generally called "sintering" and results in an increase in the strength of the porous PTFE sheet. The sintering temperature is suitably 327° C. to 460° C.

The thickness of the porous PTFE membrane of the present invention is not particularly limited, but the thickness is suitably 1 μm to 300 μm, and further suitably 2 μm to 50 μm.

The porous PTFE membrane according to the present invention has the properties suitable for use as a waterproof air-permeable membrane. Hereinafter, embodiments of the waterproof air-permeable member of the present invention will be described with reference to the drawings.

A waterproof air-permeable member shown in FIG. 1 includes a porous PTFE membrane 1 and a fixing member 2 for fixing the porous PTFE membrane 1 to a housing that should be ventilated. The fixing member 2 is joined to a joining portion of the porous PTFE membrane 1 that surrounds an air-permeable region 3 of the porous PTFE membrane 1. The surface of the fixing member 2 opposite to the surface joined to the porous PTFE membrane 1 is bonded to the surface of the housing so as to surround the opening provided in the housing. Thus, the porous PTFE membrane 1 is fixed to the housing. This configuration allows air to pass through the opening of the housing and the air-permeable region 3 of the membrane 1 and thus ensures the ventilation of the housing, while preventing water intrusion into the housing by virtue of the water resistance of the porous PTFE membrane 1.

A ring-shaped fixing member 2 is used in FIG. 1, but the shape of the fixing member 2 is not limited to the ring shape. The fixing member 2 shown in FIG. 1 is a double-sided adhesive tape, but the shape of the fixing member 2 is not limited to the tape shape. A resin member formed into a shape fitted into the opening of the housing may be used as the fixing member 2.

Figure 2:
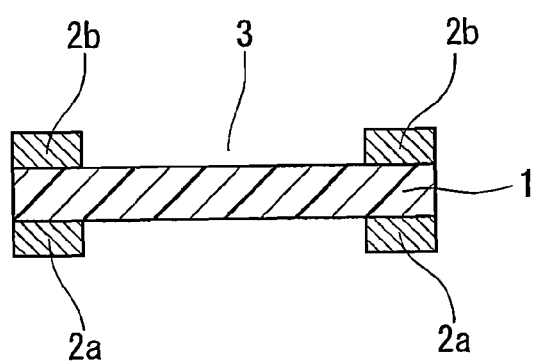
FIG. 2 is a cross-sectional view of another embodiment of the waterproof air-permeable member according to the present invention.

A waterproof air-permeable member shown in FIG. 2 includes the porous PTFE membrane 1 and a plurality of fixing members 2a and 2b. Like the fixing member 2 (FIG. 1), the fixing members 2a and 2b have a ring shape as viewed in a direction perpendicular to the membrane surface, and surround the air permeable regions 3 on both principal surfaces of the porous PTFE membrane 1. This waterproof air-permeable member is suitable, for example, for use in a housing of an electronic device. In this case, for example, the fixing member 2a is bonded to a device (for example, a speaker) mounted in the housing, and the fixing member 2b is bonded to the inner surface of the housing so as to surround the opening of the housing.

EXAMPLES

Hereinafter, the present invention will be described in further detail by way of examples, but the present invention is not limited to the following examples.

Example 1

100 parts by weight of PTFE fine powder ("Fluon CD-123N" (SSG of 2.155) manufactured by Asahi Fluoropolymers, Co., Ltd.) and 19 parts by weight of a liquid lubricant (dodecane) were mixed homogeneously and the resulting mixture was preformed into a round bar form. Next, this preformed body was extruded into a sheet form using an extruder equipped with a fishtail die. The thickness of the PTFE sheet thus obtained by the extrusion was 1.5 mm and the width thereof was 20 cm.

Furthermore, the PTFE sheet was rolled by being passed between a pair of metal pressure rolls. This rolling was performed while pulling the PTFE sheet in its longitudinal direction using a roll disposed downstream of the pressure rolls, so as to keep the length of the PTFE sheet in the transverse direction unchanged before and after the rolling. The thickness of the PTFE sheet obtained by the rolling was 0.2 mm.

Subsequently, the rolled PTFE sheet containing the liquid lubricant was stretched in its transverse direction at a stretch ratio of 3 using a tenter. Then, the stretched PTFE sheet was maintained at 150° C. to remove the liquid lubricant.

Next, after the liquid lubricant was removed, the PTFE sheet was stretched by a biaxial stretching machine both in the longitudinal direction at a stretch ratio of 4 and in the transverse direction at a stretch ratio of 4 in an atmosphere at 300° C. Thus, an unsintered porous PTFE membrane was obtained. The area stretch ratio of the stretchings performed after the liquid lubricant was removed was 16.

Finally, the unsintered porous PTFE membrane was sintered in a hot air furnace at 380° C., and a long strip of porous PTFE membrane was obtained. The thickness of this porous PTFE membrane was 30 µm.

Example 2

A porous PTFE membrane having a thickness of 17 µm was produced in the same manner as in Example 1, except that the PTFE sheet containing the liquid lubricant was stretched in its transverse direction at a stretch ratio of 5.

Example 3

A porous PTFE membrane having a thickness of 11 µm was produced in the same manner as in Example 1, except that the PTFE sheet containing the liquid lubricant was stretched in its transverse direction at a stretch ratio of 7.

Example 4

A porous PTFE membrane having a thickness of 20 µm was produced in the same manner as in Example 1, except that "601A" with a SSG of 2.150 manufactured by Dupont was used as a PTFE fine powder.

Example 5

A porous PTFE membrane having a thickness of 17 µm was produced in the same manner as in Example 4, except that the PTFE sheet containing the liquid lubricant was stretched in its transverse direction at a stretch ratio of 5.

Example 6

A porous PTFE membrane having a thickness of 14 µm was produced in the same manner as in Example 4, except that the PTFE sheet containing the liquid lubricant was stretched in its transverse direction at a stretch ratio of 7.

Example 7

A porous PTFE membrane having a thickness of 9 µm was produced in the same manner as in Example 1, except that the PTFE sheet from which the liquid lubricant had been removed was stretched in its longitudinal direction at a stretch ratio of 8 and in its transverse direction at a stretch ratio of 8. In this example, the area stretch ratio of the stretchings performed after the liquid lubricant was removed was 64.

Example 8

A porous PTFE membrane having a thickness of 5 µm was produced in the same manner as in Example 7, except that the PTFE sheet containing the liquid lubricant was stretched in its transverse direction at a stretch ratio of 5.

Example 9

A porous PTFE membrane having a thickness of 3 µm was produced in the same manner as in Example 7, except that the PTFE sheet containing the liquid lubricant was stretched in its transverse direction at a stretch ratio of 7.

Example 10

A porous PTFE membrane having a thickness of 6 µm was produced in the same manner as in Example 4, except that the PTFE sheet from which the liquid lubricant had been removed was stretched in its longitudinal direction at a stretch ratio of 8 and in its transverse direction at a stretch ratio of 8.

Example 11

A porous PTFE membrane having a thickness of 4 µm was produced in the same manner as in Example 10, except that the PTFE sheet containing the liquid lubricant was stretched in its transverse direction at a stretch ratio of 5.

Example 12

A porous PTFE membrane having a thickness of 3 µm was produced in the same manner as in Example 10, except that the PTFE sheet containing the liquid lubricant was stretched in its transverse direction at a stretch ratio of 7.

Example 13

A porous PTFE membrane having a thickness of 10 µm was produced in the same manner as in Example 10, except that the distance between the metal pressure rolls was adjusted so as to obtain a rolled PTFE sheet having a thickness of 0.4 mm. This rolling was also performed while pulling the PTFE sheet in its longitudinal direction using a roll disposed downstream of the pressure rolls, so as to keep the length of the PTFE sheet in the transverse direction unchanged before and after the rolling.

Example 14

A porous PTFE membrane having a thickness of 30 µm was produced in the same manner as in Example 7, except that "Polyflon F-104" with a SSG of 2.17 manufactured by Daikin Industries, Ltd. was used as a PTFE fine powder.

Example 15

A porous PTFE membrane having a thickness of 3 µm was produced in the same manner as in Example 14, except that the PTFE sheet containing the liquid lubricant was stretched in its transverse direction at a stretch ratio of 5.

Example 16

A porous PTFE membrane having a thickness of 2 μm was produced in the same manner as in Example 14, except that the PTFE sheet containing the liquid lubricant was stretched in its transverse direction at a stretch ratio of 7.

Comparative Example 1

A porous PTFE membrane having a thickness of 120 μm was produced in the same manner as in Example 1, except that the step of stretching the rolled PTFE sheet containing the liquid lubricant in its transverse direction was omitted.

Comparative Example 2

A porous PTFE membrane having a thickness of 110 μm was produced in the same manner as in Example 4, except that the step of stretching the rolled PTFE sheet containing the liquid lubricant in its transverse direction was omitted.

Comparative Example 3

A porous PTFE membrane having a thickness of 20 μm was produced in the same manner as in Example 7, except that the step of stretching the rolled PTFE sheet containing the liquid lubricant in its transverse direction was omitted.

Comparative Example 4

A porous PTFE membrane having a thickness of 50 μm was produced in the same manner as in Example 13, except that the step of stretching the rolled PTFE sheet containing the liquid lubricant in its transverse direction was omitted.

Comparative Example 5

A porous PTFE membrane having a thickness of 40 μm was produced in the same manner as in Example 14, except that the step of stretching the rolled PTFE sheet containing the liquid lubricant in its transverse direction was omitted.

Comparative Example 6

A porous PTFE membrane having a thickness of 60 μm was produced in the same manner as in Comparative Example 3, except that the distance between the metal pressure rolls was adjusted so as to obtain a rolled PTFE sheet having a thickness of 0.6 mm. This rolling was also performed while pulling the PTFE sheet in its longitudinal direction using a roll disposed downstream of the pressure rolls, so as to keep the length of the PTFE sheet in the transverse direction unchanged before and after the rolling.

Comparative Example 7

A porous PTFE membrane having a thickness of 80 μm was produced in the same manner as in Comparative Example 4, except that the distance between the metal pressure rolls was adjusted so as to obtain a rolled PTFE sheet having a thickness of 0.8 mm. This rolling was also performed while pulling the PTFE sheet in its longitudinal direction using a roll disposed downstream of the pressure rolls, so as to keep the length of the PTFE sheet in the transverse direction unchanged before and after the rolling.

Comparative Example 8

A porous PTFE membrane having a thickness of 50 μm was produced in the same manner as in Comparative Example 5, except that the distance between the metal pressure rolls was adjusted so as to obtain a rolled PTFE sheet having a thickness of 0.4 mm. This rolling was also performed while pulling the PTFE sheet in its longitudinal direction using a roll disposed downstream of the pressure rolls, so as to keep the length of the PTFE sheet in the transverse direction unchanged before and after the rolling.

Comparative Example 9

100 parts by weight of PTFE fine powder ("Polyflon F-104" with a SSG of 2.17, manufactured by Daikin Industries, Ltd.) and 19 parts by weight of a liquid lubricant (dodecane) were mixed homogeneously and the resulting mixture was preformed into a round bar shape. Next, this preformed body was paste-extruded into a round bar. The diameter of the extruded PTFE sheet was 44 mm.

The round bar-formed body was further pressed at 150 kN for 30 minutes to obtain a sheet with a thickness of 0.2 mm. Furthermore, the PTFE sheet was rolled by being passed between a pair of metal pressure rolls. This rolling was performed while pulling the PTFE sheet in its longitudinal direction using a roll disposed downstream of the pressure rolls, so as to keep the length of the PTFE sheet in the transverse direction unchanged before and after the rolling. The subsequent steps were performed in the same manner as in Comparative Example 1. Thus, a porous PTFE membrane having a thickness of 80 μm was obtained.

Comparative Example 10

A porous PTFE membrane having a thickness of 120 μm was produced in the same manner as in Comparative Example 5, except that the PTFE sheet from which the liquid lubricant had been removed was stretched in its longitudinal direction at a stretch ratio of 4 and in its transverse direction at a stretch ratio of 4.

Comparative Example 11

An attempt was made to produce a porous PTFE membrane in the same manner as in Example 7, except that "Fluon CD-1" with a SSG of 2.20, manufactured by Asahi Fluoropolymers Co., Ltd. was used as a PTFE fine powder. However, the sheet was broken when it was stretched in its longitudinal direction at a stretch ratio of 8 and in its transverse direction at a stretch ratio of 8.

Comparative Example 12

An attempt was made to produce a porous PTFE membrane in the same manner as in Example 8, except that "Fluon CD-1" with a SSG of 2.20, manufactured by Asahi Fluoropolymers Co., Ltd. was used as a PTFE fine powder. However, the sheet containing the liquid lubricant was broken when it was stretched in its transverse direction at a stretch ratio of 5.

For each of the porous PTFE membranes obtained in all Examples and Comparative Examples 1 to 10, the water entry pressure and air permeability were measured. The water entry pressure was measured using a water resistance tester (high pressure method) specified in JIS L 1092. As for the air permeability, the Gurley number G [sec/100 ml] was measured using a Gurley tester specified in JIS P 8117, and the Gurley number G was converted into a Frazier number F using the relational expression (4). As for each of the porous PTFE membranes having a high air permeability, 300 ml of air, instead of 100 ml of air, was used for the measurement of the Gurley number to increase the measurement accuracy. Then, based on this measurement result, the time required for 100 ml of air to pass through the porous PTFE membrane was calculated. Thus, the Gurley number G was obtained. When 300 ml of air was used, one third of the obtained Gurley number was used as a value of G and substituted into the relational expression (4). Table 1 shows the results.

Figure 3:
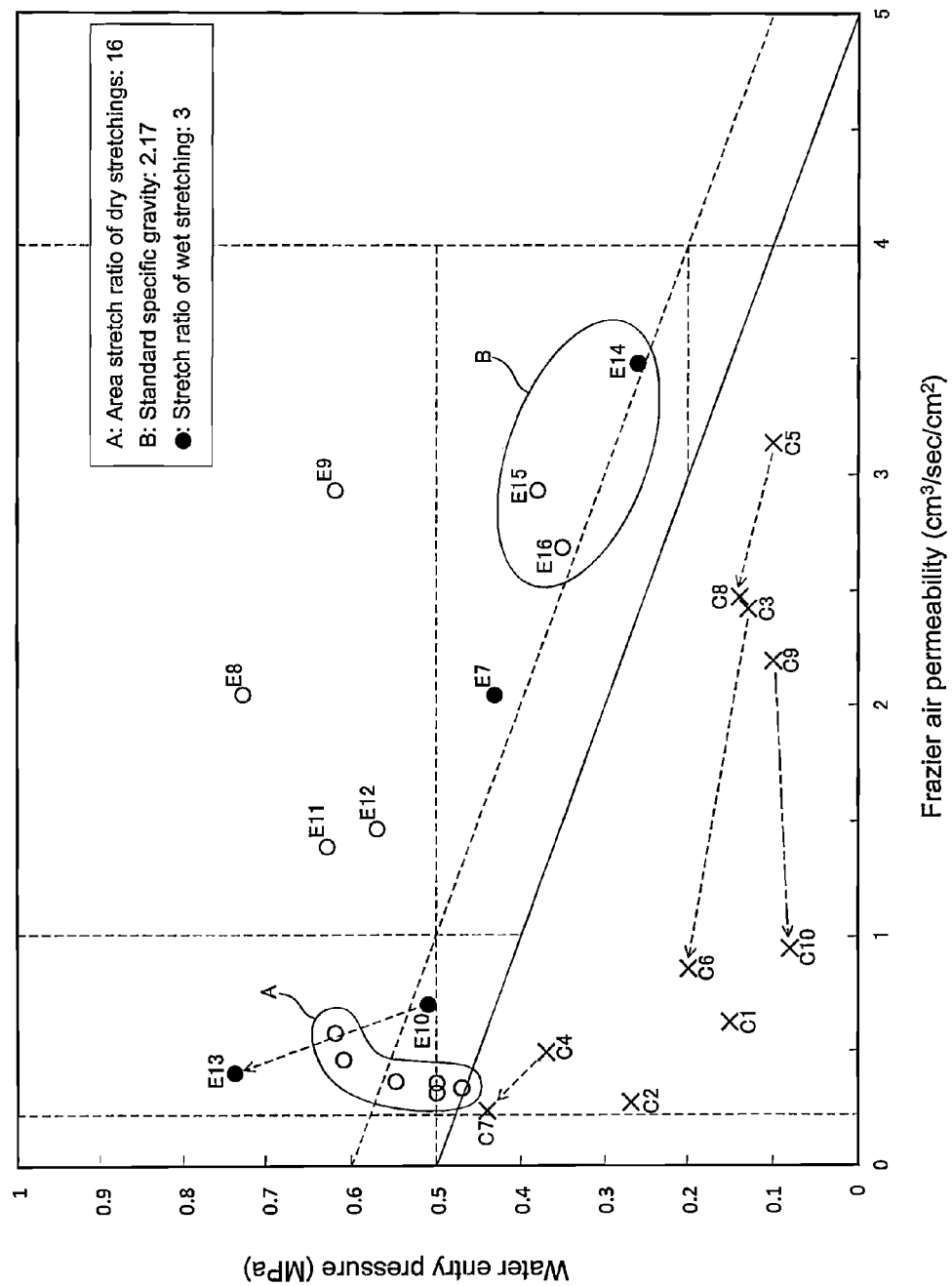
FIG. 3 is a diagram showing the water entry pressures and air permeabilities of porous PTFE membranes according to the present invention and those of conventional porous PTFE membranes.

FIG. 3 shows the water entry pressures and air permeabilities thus measured. In FIG. 3, white circles and black circles represent Examples, and cross marks represent Comparative Examples. The numbers following "E" denote the numbers of Examples, and the numbers following "C" denote the numbers of Comparative Examples.

As indicated by dashed line arrows in FIG. 3, as the thickness of the porous PTFE membrane is increased by changing the thickness of the rolled sheet, the water entry pressure increases while the air permeability decreases. As shown in FIG. 3, since the water entry pressure and the air permeability are usually in a trade-off relationship, it is difficult to improve both of them. Furthermore, as indicated by an alternate long and short dashed line arrow in FIG. 3, the air permeability rather decreases by merely changing the shape extruded from a die from a round bar to a sheet using a fishtail die. Comparative Examples are plotted below a straight line indicated by a solid line in FIG. 3 (R<−0.1F+0.5).

Compared to Comparative Examples, the porous PTFE membranes of Examples achieve both high water resistance and high air permeability in a well-balanced manner, although they are single-layer membranes, and are plotted above the straight line in FIG. 3 (R≥−0.1F+0.5).

Among the porous PTFE membranes of Examples, those of Examples 8, 9, 11 and 12, each obtained by using a PTFE fine powder having a standard specific gravity of 2.16 or less, setting the stretch ratio in the stretching (wet stretching) in the step C to 5.0 or more, and setting the area stretch ratio of the stretchings (dry stretchings) in the step E to 50 or more and 140 or less, exhibited properties such as a Frazier air permeability F of 1 to 4 cm$^3$/sec/cm$^2$ and a water entry pressure R of 0.5 to 1 MPa and achieved a good balance between particularly high water resistance and particularly high air permeability.

In FIG. 3, the membranes of Examples obtained by setting the area stretch ratio of the dry stretchings to 16 (less than 50) are designated as Group A, those of Examples obtained by using a PTFE fine powder having a standard specific gravity of 2.17 (more than 2.16) are designated as Group B, and those of Examples obtained by setting the stretch ratio of the wet stretching to 3 (less than 5) are indicated by black circles. Compared with the membranes of Examples included in these groups A and B and indicated by black circles, the membranes of Examples 8, 9, 11, and 12 are found to have both water resistance and air permeability in a well-balanced manner.

TABLE 1

| | PTFE (Standard specific gravity) | Thickness after rolling (mm) | Stretch ratio of transverse wet stretching | Stretch ratios of dry stretchings | Frazier air permeability (cm$^3$/sec/cm$^2$) | Water entry pressure (MPa) |
|---|---|---|---|---|---|---|
| Ex. 1 | CD123 (2.155) | 0.2 | 3 | 4 × 4 | 0.35 | 0.47 |
| Ex. 2 | CD123 (2.155) | 0.2 | 5 | 4 × 4 | 0.47 | 0.61 |
| Ex. 3 | CD123 (2.155) | 0.2 | 7 | 4 × 4 | 0.59 | 0.62 |
| Ex. 4 | 601A (2.150) | 0.2 | 3 | 4 × 4 | 0.33 | 0.50 |
| Ex. 5 | 601A (2.150) | 0.2 | 5 | 4 × 4 | 0.38 | 0.55 |
| Ex. 6 | 601A (2.150) | 0.2 | 7 | 4 × 4 | 0.37 | 0.50 |
| Ex. 7 | CD123 (2.155) | 0.2 | 3 | 8 × 8 | 2.05 | 0.43 |
| Ex. 8 | CD123 (2.155) | 0.2 | 5 | 8 × 8 | 2.05 | 0.73 |
| Ex. 9 | CD123 (2.155) | 0.2 | 7 | 8 × 8 | 2.94 | 0.62 |
| Ex. 10 | 601A (2.150) | 0.2 | 3 | 8 × 8 | 0.71 | 0.51 |
| Ex. 11 | 601A (2.150) | 0.2 | 5 | 8 × 8 | 1.39 | 0.63 |
| Ex. 12 | 601A (2.150) | 0.2 | 7 | 8 × 8 | 1.47 | 0.57 |
| Ex. 13 | 601A (2.150) | 0.4 | 3 | 8 × 8 | 0.41 | 0.74 |
| Ex. 14 | F104 (2.17) | 0.2 | 3 | 8 × 8 | 3.49 | 0.26 |
| Ex. 15 | F104 (2.17) | 0.2 | 5 | 8 × 8 | 2.94 | 0.38 |
| Ex. 16 | F104 (2.17) | 0.2 | 7 | 8 × 8 | 2.69 | 0.35 |
| Com. Ex. 1 | CD123 (2.155) | 0.2 | — | 4 × 4 | 0.63 | 0.15 |
| Com. Ex. 2 | 601A (2.150) | 0.2 | — | 4 × 4 | 0.28 | 0.27 |
| Com. Ex. 3 | CD123 (2.155) | 0.2 | — | 8 × 8 | 2.42 | 0.13 |
| Com. Ex. 4 | 601A (2.150) | 0.4 | — | 8 × 8 | 0.50 | 0.37 |
| Com. Ex. 5 | F104 (2.17) | 0.2 | — | 8 × 8 | 3.14 | 0.10 |
| Com. Ex. 6 | CD123 (2.155) | 0.6 | — | 8 × 8 | 0.86 | 0.20 |
| Com. Ex. 7 | 601A (2.150) | 0.8 | — | 8 × 8 | 0.25 | 0.44 |
| Com. Ex. 8 | F104 (2.17) | 0.4 | — | 8 × 8 | 2.47 | 0.14 |
| Com. Ex. 9 | F104 (2.17) | 0.2*) | — | 4 × 4 | 2.20 | 0.10 |
| Com. Ex. 10 | F104 (2.17) | 0.2 | — | 4 × 4 | 0.95 | 0.08 |
| Com. Ex. 11 | CD-1 (2.20) | 0.2 | 3 | 8 × 8 | (Broken) | (Broken) |
| Com. Ex. 12 | CD-1 (2.20) | 0.2 | 5 | — | (Broken) | (Broken) |

Figure 4:
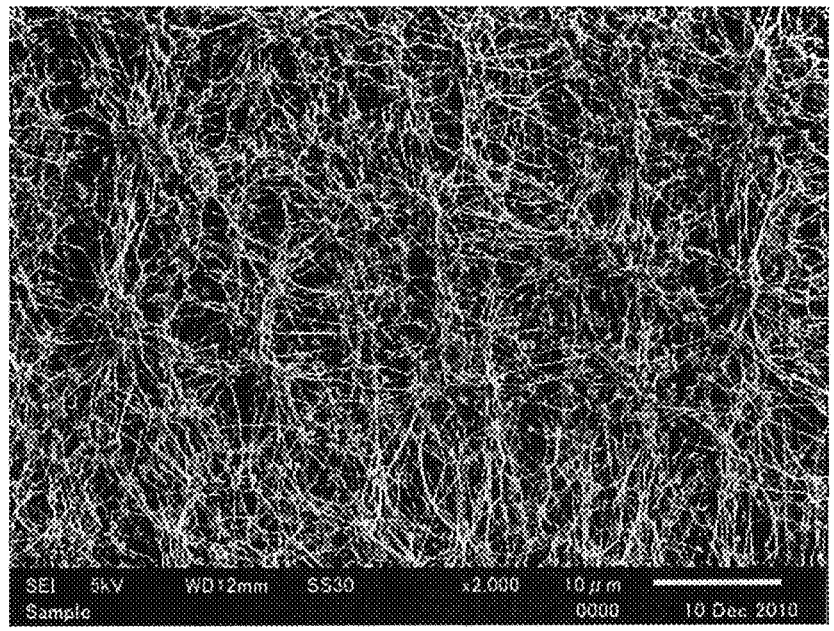
FIG. 4 is a scanning electron microscope (SEM) micrograph of a porous PTFE membrane obtained in Example 14.
Figure 5:
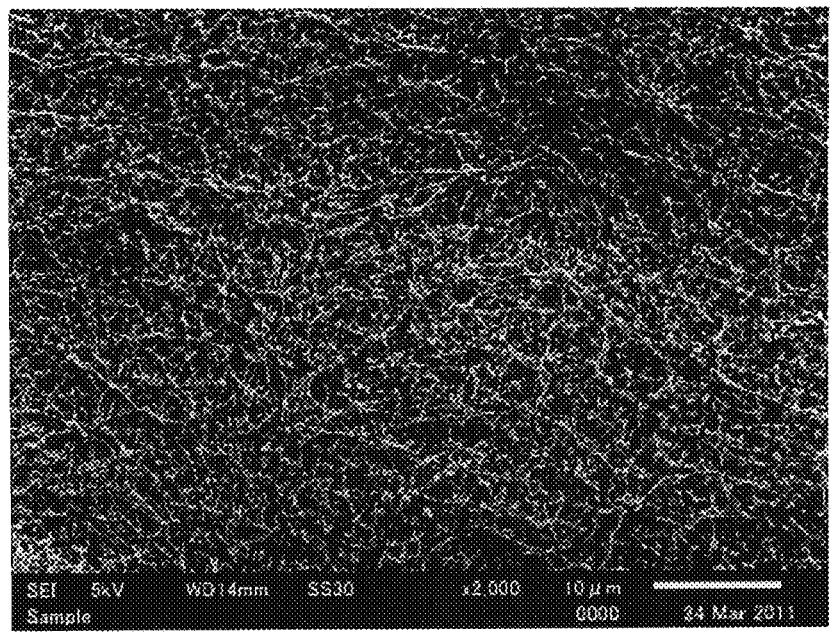
FIG. 5 is a SEM micrograph of a porous PTFE membrane obtained in Example 15.
Figure 6:
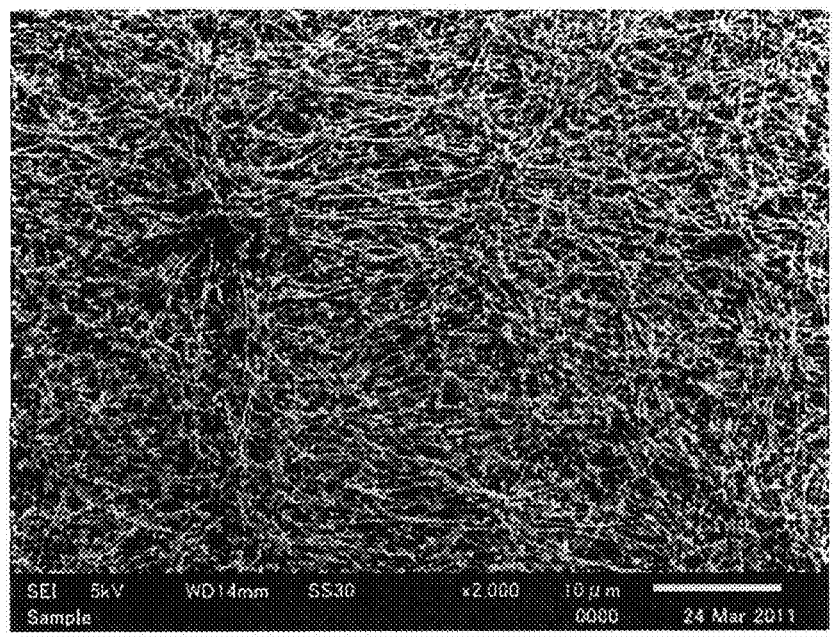
FIG. 6 is a SEM micrograph of a porous PTFE membrane obtained in Example 16.
Figure 7:
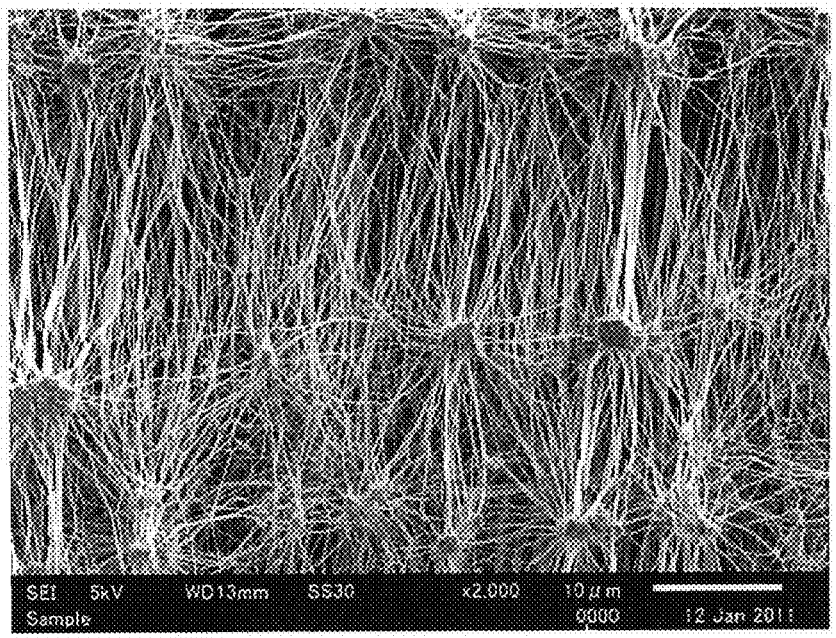
FIG. 7 is a SEM micrograph of a porous PTFE membrane obtained in Comparative Example 5.

*)In Comparative Example 9, the PTFE mixture was extruded into a round bar form and then pressed to obtain a sheet with a thickness of 0.2 mm FIG. 4 to FIG. 6 show scanning electron microscope (SEM) micrographs of the porous PTFE membranes obtained in Examples 14 to 16. FIG. 7 shows a SEM micrograph of the porous PTFE membrane obtained in Comparative Example 5. In each of these SEM micrographs, the vertical direction is the longitudinal direction (MD direction). Compared with the membrane structure of the porous PTFE membrane obtained by the conventional production method (FIG. 7), the membrane structure of the porous PTFE membranes of FIG. 4 to FIG. 6 is characterized by smaller diameter fibrils, a larger number of "nodes", which are too small to identify as nodes, and an increase in the number of fibrils extending in directions other than the stretching directions.

The invention claimed is:

1. A porous polytetrafluoroethylene membrane that satisfies the following relational expressions (1) to (3):

$$1.7 \leq F \leq 4.0 \tag{1};$$

$$0.2 \leq R \leq 0.43 \tag{2}; \text{ and}$$

$$R \geq -0.1F + 0.6 \tag{3},$$

when air permeability in terms of Frazier number is denoted by F [cm³/sec/cm²] and water entry pressure is denoted by R [MPa], the Frazier number being a value measured using a Frazier type tester specified in JIS L 1096, and the water entry pressure being a value measured using a water resistance tester (high pressure method) specified in JIS L 1092.

2. The porous polytetrafluoroethylene membrane according to claim 1, wherein the membrane is a single-layer membrane.

3. The porous polytetrafluoroethylene membrane according to claim 1, wherein the membrane further satisfies the following relational expression (1a):

$$3.49 \leq F \leq 4.0 \tag{1a}.$$

4. A waterproof air-permeable member comprising: a porous polytetrafluoroethylene membrane; and a fixing member disposed on the porous polytetrafluoroethylene membrane, wherein
the fixing member is joined to a joining portion of the porous polytetrafluoroethylene membrane that surrounds an air-permeable region of the porous polytetrafluoroethylene membrane, and
the porous polytetrafluoroethylene membrane is the porous polytetrafluoroethylene membrane according to claim 1.

* * * * *